United States Patent
Jones

(10) Patent No.: US 7,967,524 B2
(45) Date of Patent: Jun. 28, 2011

(54) STACKABLE LANDSCAPE EDGING

(75) Inventor: Stephen Jones, Prior Lake, MN (US)

(73) Assignee: Pave Tech Inc., Lakeville, MN (US)

( * ) Notice: Subject to any disclaimer, the term of this patent is extended or adjusted under 35 U.S.C. 154(b) by 614 days.

(21) Appl. No.: 12/075,126

(22) Filed: Mar. 7, 2008

(65) Prior Publication Data

US 2009/0223121 A1    Sep. 10, 2009

(51) Int. Cl.
*E02D 27/00*    (2006.01)

(52) U.S. Cl. .................. 404/8; 404/7; 52/102

(58) Field of Classification Search .......... 404/7, 8; 52/102
See application file for complete search history.

(56) References Cited

U.S. PATENT DOCUMENTS

| | | | |
|---|---|---|---|
| 3,222,841 A | 12/1965 | Lipof | 52/731 |
| 4,101,111 A * | 7/1978 | Bishop | 249/205 |
| 4,863,307 A | 9/1989 | Jones | 404/7 |
| 5,073,061 A | 12/1991 | Jones | 404/7 |
| 5,240,343 A | 8/1993 | Strobl, Jr. | 404/7 |
| 5,769,562 A * | 6/1998 | Jones | 404/7 |
| D424,714 S | 5/2000 | Hale | D25/164 |
| 6,099,201 A | 8/2000 | Abbrancati | 404/7 |
| 6,230,451 B1 * | 5/2001 | Stoller | 52/169.1 |
| 6,379,078 B1 * | 4/2002 | Zwier | 404/7 |
| 6,409,421 B1 | 6/2002 | Jones | 404/7 |
| 6,767,159 B2 | 7/2004 | Jones | 404/7 |
| 6,769,562 B2 | 8/2004 | Schroeder | 220/3.5 |

* cited by examiner

*Primary Examiner* — Gary S Hartmann
(74) *Attorney, Agent, or Firm* — Westman Champlin & Kelly, P.A.

(57) ABSTRACT

A landscape edging member for use in defining borders of walks, patios, driveways and the like, is provided with edge lips on one side of a base wall, which serve as stops when one of the landscape edging members is inverted and nested with another landscape edging member, to prevent lateral shifting of the nested landscape edging members when they are placed in a stack or bundle. The lips of the nested landscape edging members overlap portions of the vertical walls of the other one of the two nested landscape edging members, which form an inverted pair of landscape edging members. The lips are high enough from the base wall to prevent lateral shifting of the nested pair when a stack of the landscape edging members are shipped.

6 Claims, 3 Drawing Sheets

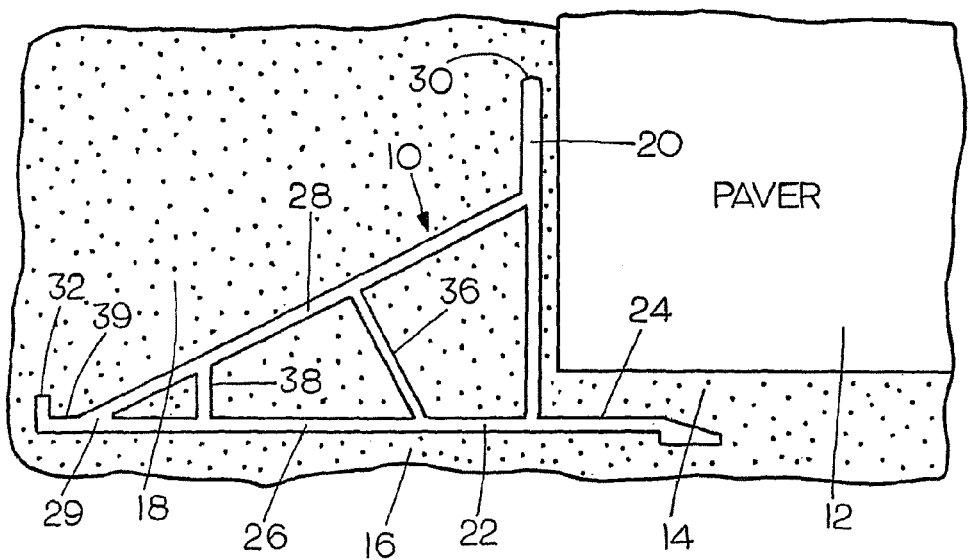
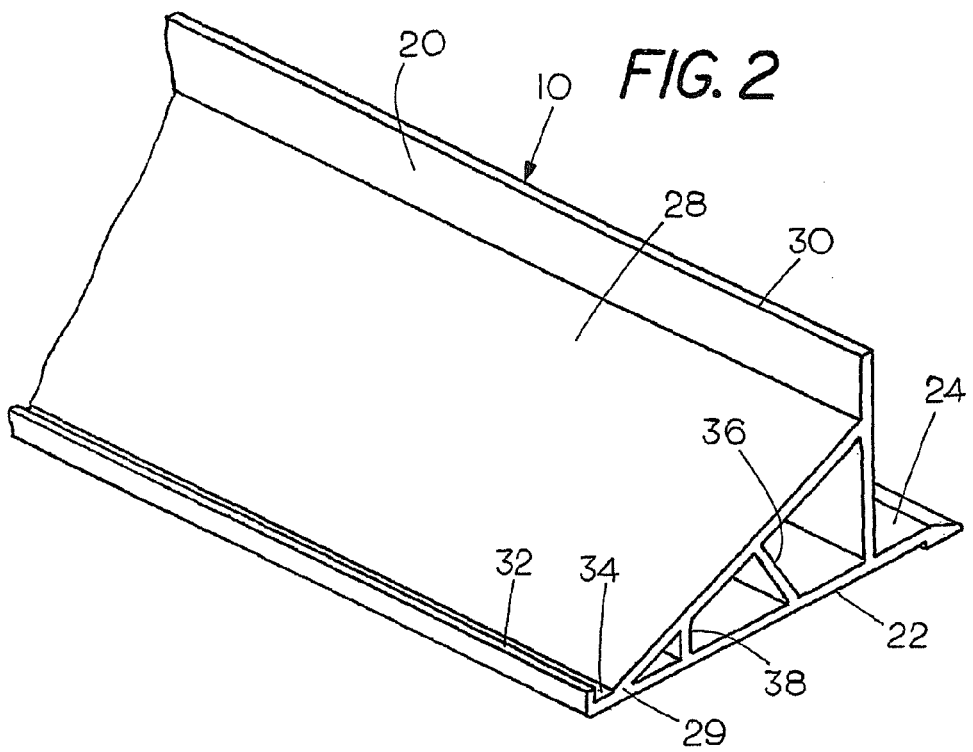

STACKABLE LANDSCAPE EDGING

BACKGROUND OF THE INVENTION

The present invention relates to landscape edging that has a base wall and an upright wall that engages material to be restrained in a predetermined boundary, and wherein an edge lip is formed on the base wall spaced from the upright wall so that when stacking two lengths of the landscape edging, one inverted over the other, the lip of each base wall overlaps the upper edge of the upright wall of the other landscape edging length to restrain the two lengths from shifting laterally when placed in a shipping stack or bundle.

Landscape edging members are shown in U.S. Pat. No. 5,073,061, for restraining segmental pavements, and in the form shown in the patent, the edging has a base wall which is supported in ground, at an appropriate level, and a vertical wall that restrains the segmental pavements from lateral movement, when they are installed.

Another form of edging is made in two parts, with a vertical wall that can be curved along its length. Separate braces are used at selected intervals to support the vertical wall and yet permit it to be curved.

SUMMARY OF THE DISCLOSURE

The present disclosure relates to an elongated landscape edging member that has a horizontal base, and an upright wall on the base and has an upright lip of suitable height along the outer edge of the base opposite from the upright wall. When a pair of lengths of the elongated landscape edging members are stacked, with one length inverted over the other, the lip of one length overlaps an upper edge of the upright wall of the other length of landscape edging of the pair to prevent the landscape edging members forming this stacked pair or set from shifting laterally when strapped into a bundle or stack.

In the specific form disclosed the landscape edging member has an inclined brace wall joined to the base adjacent but spaced from the lip, and extending to overlie the base. The inclined wall joins the upright wall to resist lateral loads caused by the material, such as segmental pavements as shown, that are being restrained by the edging. The base is generally secured to the ground in use, so that the edging will not shift in use.

The underlying or bottom surface of the base of one of the pair of the landscape edging members forming an inverted pair or set can be placed on the bottom surface of the base of another inverted pair and the mating planar surface can be clamped together when a completed stack of inverted pairs are strapped for shipping, without a tendency to slide laterally. Friction between the mating planar surfaces of the stacked inverted pairs is sufficient so the individual sets of inverted pairs will not slip laterally.

In the preferred form shown upright lips on the landscape edging members are spaced outwardly from the junction between the base and the inclined wall of the backing or bracing of each edging member of an inverted pair to permit the outer end of the vertical wall of the other edging member to be overlapped by the lips to nest the inverted pair of landscape edging members and retain them in place.

Without the edge lips with adequate height to stop lateral movement between the lengths of the landscape edging members in the inverted pair or sets, the landscape edging members in the inverted pair or set tend to work and vibrate against each other and slide laterally and loosen the strapping holding the stack. Damage to the landscape edging members can then occur. Having the individual inverted pairs secured against lateral movement relative to each other makes the stacking simpler, more reliable and less costly, since it has been found that fewer straps along the length of the bundle formed are required.

The landscape edging members may be in the form of an "L", with the upright wall along one edge of the base and the lip along the other edge, or the landscape edging can be "T" shaped, with the upright wall spaced inwardly from the edges of the base.

BRIEF DESCRIPTION OF THE DRAWINGS

FIG. 1 is a side view of a typical landscape edging shown schematically with a retained segmental pavement shown fragmentarily;

FIG. 2 is a perspective view of the landscape edging member of FIG. 1 illustrating a partial length of such landscape edging;

DESCRIPTION OF THE EXEMPLARY EMBODIMENTS

Figure 3:
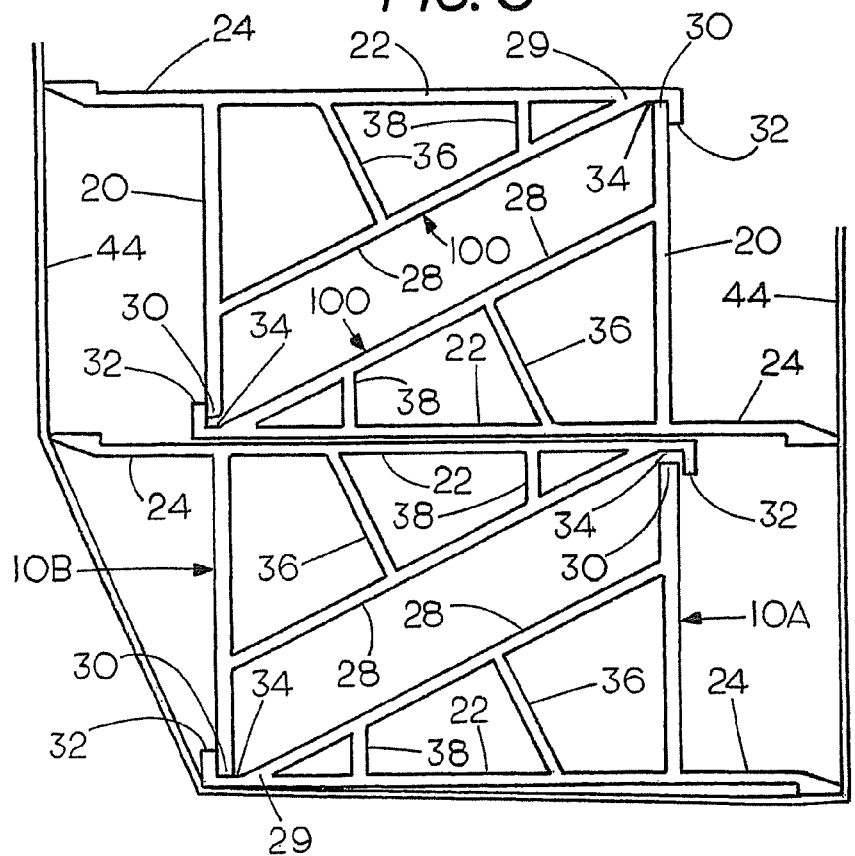
FIG. 3 is an end elevational view of a start of a typical shipping stack or bundle utilizing the landscape edging members made according the present disclosure.

Landscape edging systems in previous or prior art forms are shown in detail in U.S. Pat. Nos. 5,073,061 and 6,409,421, the disclosures of which are incorporated by reference.

As shown in FIG. 1, a landscape edging member 10 is used for holding segmental pavements or pavers 12 in position for forming walkways, patios, driveways and other hard surface areas. The landscape edging members can be used for any landscape purpose, such as borders on walkways, driveways, patios or as lawn or flower bed edging, or for other purposes. As shown, for illustration, segmental pavements 12 are placed onto a prepared bed of sand or suitable aggregate 14, that is on top of a base 16. A layer of soil, and a covering of sod indicated just generally at 18 is on an opposite or back side of the landscape edging member from the segmental pavements, and spikes can be used to retain the landscape edging member in position, as is well known.

The landscape edging member 10 is formed in a continuous selected length, for example, as an extruded plastic strip or if desired a metal strip, such as aluminum, that is cut into sections of a suitable length for shipping. The landscape edging member 10 has a material restraining upright wall 20 that is integral with a horizontal or base wall 22. The base wall 22 has a lateral front horizontal extension 24 that underlies the bed 14 and the segmental pavement 12, and also has a support portion 26 that extends outwardly horizontally from the vertical wall 20 in a direction away from the segmental pavement 12.

For structural reinforcement purposes, if desired, an inclined gusset or brace wall 28 extends between the vertical wall 20 and the base wall 22. The inclined wall 28 joins the base at a junction 29, adjacent, but spaced from an outer edge of the base wall 22. The inclined wall 28 inclines upwardly and overlies the base wall 22 and joins the upright wall at a location spaced downwardly from the upper edge 30 of the upright wall. An upright lip 32 is spaced from the junction 29 with a short horizontal base wall segment 34 that is flat and coplanar with and essentially is an extension of the base wall 22. The upright lip 32 is at and extends along the length of the landscape edging member 10, for a selected length, which can be for the full length, or only portions, of the overall length of the landscape edging member.

The lip 32 and the base wall segment 34 beyond the junction 29 of the inclined wall 28 and base wall 22 increases the rigidity of the landscape edging member to resist bending of the landscape edging member 10 in a horizontal plane. Suitable internal brace walls 36 and 38 are provided between the base wall 22 and the inner or under surface of the inclined wall 28.

It can be seen in FIG. 2 that the landscape edging member 10 has a longitudinal length that can be selected as desired, since the landscape edging member is preferably extruded. Generally the overall length of the landscape edging member sections will be selected for suitable shipping lengths, for example, in the range of seven feet, but this length can be varied as desired. The edging members are fairly rigid, and are shipped in their elongated condition, rather than being formed into a roll.

Figure 4:
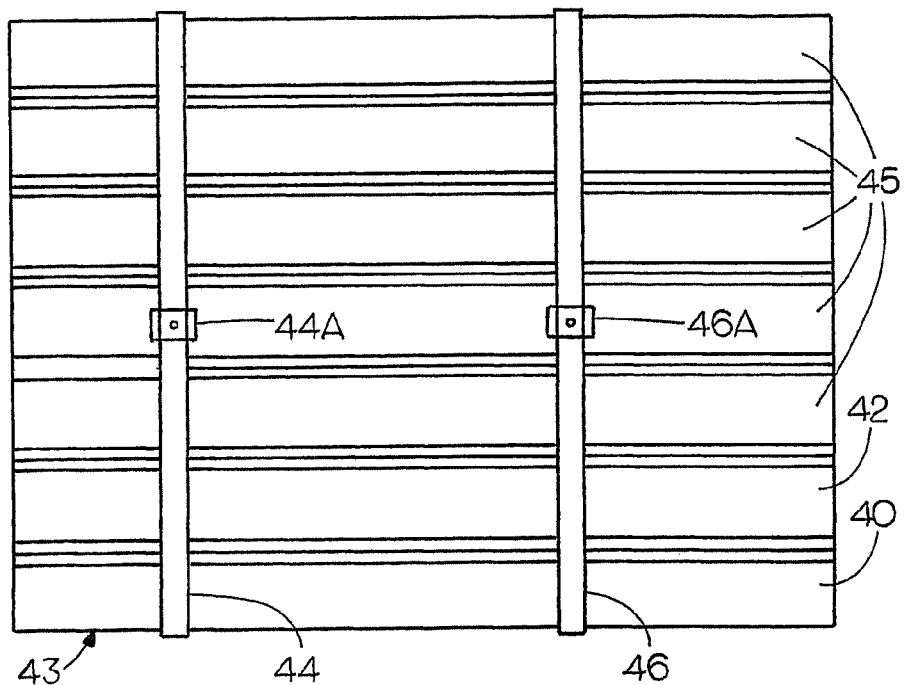
FIG. 4 is a schematic representation of a side view of a typical stack of the landscape edging length sections shown in FIG. 1.

The landscape edging members 10 are stacked as shown in FIGS. 3 and 4 for shipping. A first length of landscape edging 10A, that is constructed as previously explained, is considered a lower member of a first set or inverted pair 40 of landscape edging members. A second length of landscape edging is inverted, so that the inclined wall 28 of the landscape edging member 10B is facing the inclined wall 28 of the landscape edging member 10A. The end or edge 30 of the upright wall 20 of landscape edging member 10B is then placed so that it contacts the flat base wall segment 34 with the lip 32 of the landscape edging member 10A overlapping the edge of the vertical wall 20 of the restraint member 10B. When this is done, the edge 30 of the wall 20 of the landscape edging member 10A is in place against the flat surface of base wall segment 34 and inside the lip 32 of the restraint member 10B. In other words, the lip 32 of the landscape edging member 10B overlaps the upper end of the upright wall 20 of the landscape edging member 10A. The stacked edging members 10A and 10B form the set or inverted pair 40 of landscape edging members.

The lips 32 are selected to be narrow, about the same thickness as the base wall, and having a vertical height sufficient to form a stop to prevent the upper edge of the upright wall of the inverted edge restraint member from sliding off the surface of the base wall. This lip forming a stop will retain the inverted pair of edging members from sliding laterally relative to each other. A vertical height of the lip 32 of no less than $\frac{1}{16}$ of an inch up to about $\frac{1}{2}$ inch is satisfactory. The lip height is to be distinguished from the height of the bottom bosses used in some prior edging shown in the prior patents to provide friction with the ground for retention in use, and which are not high enough to be effective to stop or restrain lateral shifting of the inverted pair of edging members.

The inverted pair leaves the normally bottom surface of base wall 22 of the inverted landscape edging member 10B facing upwardly. A second set or second inverted pair 42 of landscape edging members is stacked as just explained and as shown in FIG. 3 is placed on top of the first set 40. A third landscape edging member 10C is placed on top of landscape edging member 10B and a fourth inverted landscape edging member 10D is placed on top of third landscape edging member 10C. The base wall 22 of the landscape edging member 10C in the set or inverted pair 42 rests against the surface of the base wall 22 of the landscape edging member 10B to form a start of a stack for shipping. Additional sets or inverted pairs of landscape edging members 10 are placed on top of the illustrated sets of inverted pairs to form a shipping bundle.

When the landscape edging member 10D is inverted relative to the landscape edging member 10C, and placed over it, the end 30 of the upright wall of the landscape edging member 10C is against the surface of base wall segment 34 and inside the lip 32 of the landscape edging member 10D. The end 30 of the upright wall of landscape edging member 10D then rests against the surface 34 and is to the inside of the lip 32 of the landscape edging member 10C. The lips 32 thus overlap upper edge portions of the upright walls of the other landscape edging member forming the set or inverted pair 42, and are effective to prevent the lateral shifting of the pair.

The additional landscape edging members to be shipped are formed into sets or inverted pairs, as shown in FIG. 3, and stacked as shown at 45 in FIG. 4, to a height that is desired to form a shipping bundle for example, between twelve and twenty of the individual landscape edging members in a stack. In FIG. 4, the stack or bundle 43 is illustrated schematically, and it can be seen that the stack is held in a bundle with suitable straps 44 and 46. The straps are held with couplings or fasteners 44A and 46A, which are conventional fasteners. The straps are also conventional, and suitable tension can be placed in the straps when they are fastened around the stack or bundle.

Some prior landscape edging members that had continuous lengths of upright walls for the full length used for shipping were made so that the base walls 22 ended at the junction with the inclined or brace walls. Other full length upright walls had a short extension of the base wall beyond the junction with the inclined wall, but no upright lip. When a pair of these members were inverted and stacked, the ends 30 of the vertical walls were engaged right at the junction 29, and were not restrained from lateral movement, so that when strapping such as that shown at 44 and 46 was placed around the bundles or stacks, the landscape edging members would tend to shift or compress. When the bundles or stacks were shipped, the landscape edging members would tend to vibrate and abrade one another from vibrations and shock loads during shipment. The straps could loosen and when they were cut when the stack was in its desired location, the landscape edgings would spill out and would not remain in a stack. Other landscape edging members had spaced braces that has short connector parts and receivers for mating when inverted as shown in U.S. Pat. No. 6,409,421.

With the lips 32 acting as stops along a length of wall segment 34, so that the inverted landscape edging members resist horizontal shifting when placed one on top of the other as shown in FIG. 3 at 10A and 10B, and at 10C and 10D, the landscape edging members will not shift laterally even with tension in the securing straps 44 and 46 that are shown. The facing base walls 22 as shown in FIG. 3 between the base of the inverted landscape edging member 10B and the next upper landscape edging member 10C are in contact when the straps are tightened, so friction between the large surfaces of the base walls that face and contact each other will prevent lateral shifting between sets of inverted pairs when the straps are tightened. This resistance to lateral shifting between the surfaces of the facing base walls 22 is sufficient to insure the bundled landscape edging members do not shift laterally relative to each other when in the stacks.

Figure 5:
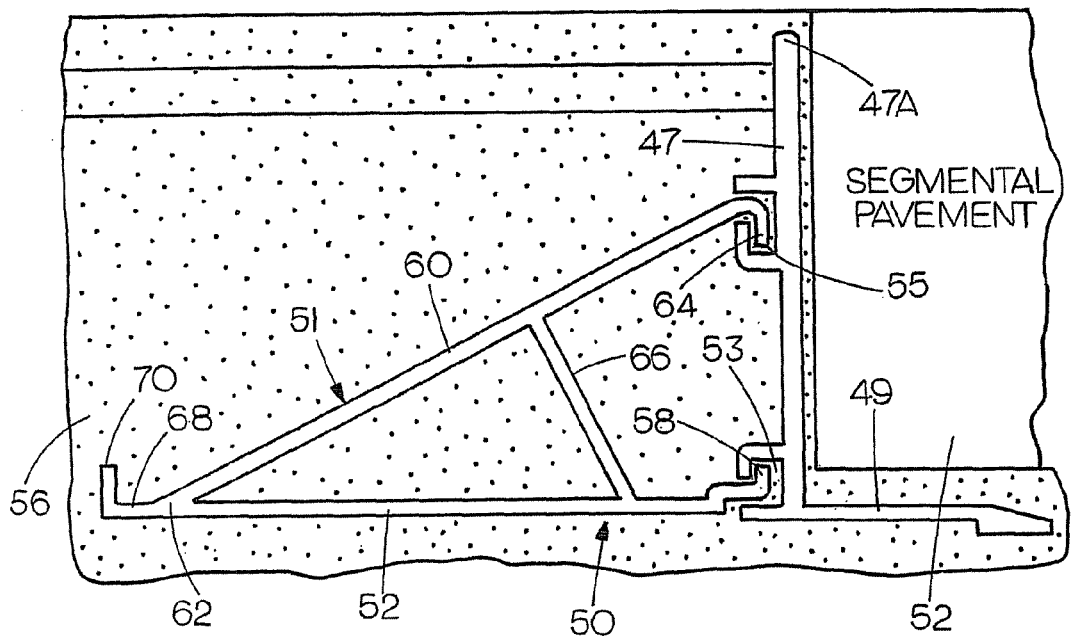
FIG. 5 is an end elevational view of a modified form of the landscape edging member utilizing the features of the present disclosure.
Figure 6:
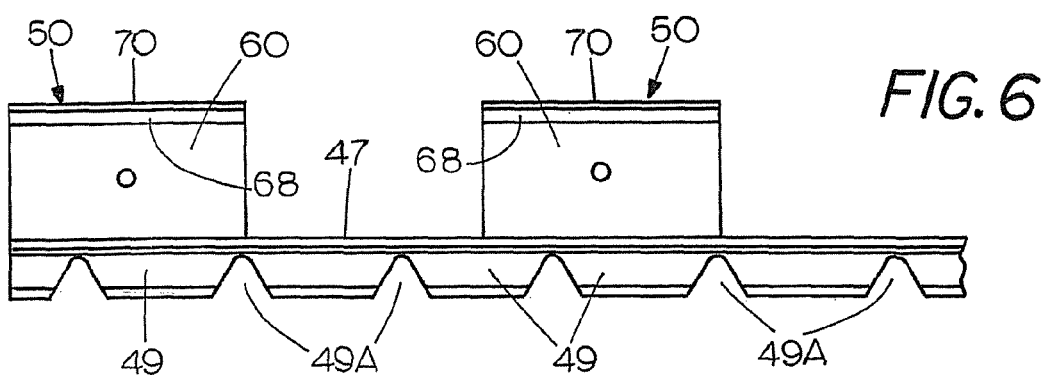
FIG. 6 is a to view of a length of the landscape edging of FIG. 5.
Figure 7:
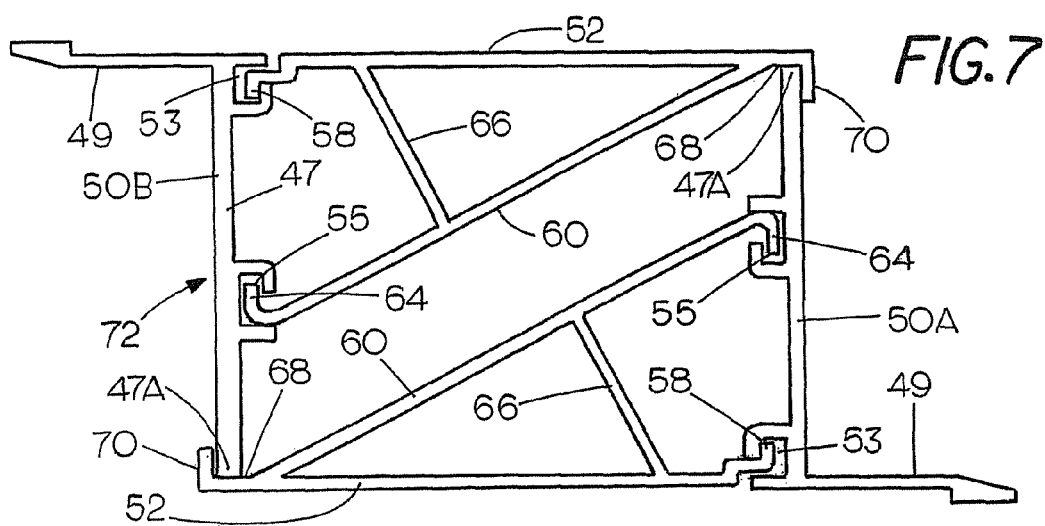
FIG. 7 is an end elevational view of a pair of the landscape edging members of FIG. 5 in position for stacking for shipping.

FIGS. 5, 6 and 7 illustrate the principals of the present disclosure in a modified landscape edging member. The landscape edging member 50 shown in FIG. 5 is also used for providing landscape edging, for example, as shown, for segmented pavements indicated at 52 supported on a bed 54 of sand or other suitable substrates. The landscape edging members are anchored in a suitable manner, such as using spikes and are under a layer of earth and sod indicated generally at 56 when installed.

The landscape edging member 50 is a composite structure having upright wall 47 and attached brace or backing sections 51 that are spaced apart along the length of the upright wall 47. The upright wall 47 has a base flange 49 corresponding to the extension 24 of the landscape edging member 10. The flange 49 extends under the segmented pavement sections and has notches 49A (FIG. 6) that permit the upright wall 47 to be curved when installed.

Each of the brace sections 51 has a base wall 52 with a short upwardly extending wall section 58 that mates in a groove or connector 53 formed by an inverted flange on the back or outer side of the upright wall 47. A gusset or inclined brace wall 60 is joined to the base wall 52 at an outer junction 62, spaced from the wall 47. The inclined wall 60 has a short downwardly extending wall section 64 at the end adjacent upright wall 47 that is spaced above the base 52 and is held in a groove or connector 55 formed with a flange on the back side of upright wall 47. The short wall sections 58 and 60 are on a common plane perpendicular to the base wall so the hold the wall 47 upright when connected to it.

The short wall sections 58 and 64 are secured in place in the respective grooves or connectors on the wall 47 by staples or adhesives to form the landscape edging member 50. The brace sections 51 are extruded, so there are no vertical wall portions or protrusions along the length of the landscape edging member. The brace sections are spaced apart along the length of wall 47 and provide support to hold the landscape edging member in position for use with the wall 47 curved along its length. The landscape edging members 47 are straight when shipped, but the notches 49A permit curving the wall 47 between the brace sections 51.

There is a brace 66 between the base wall 52 and the interior surface of the gusset or inclined wall 60 for strength.

A flat base wall section 68 extends outwardly from the junction 62 of the inclined wall and the base wall 52, and is essentially an extension of the base wall 52. A lip 70 that extends upwardly joins the outer edge of wall section 68, as shown. The lip 70 extends a selected distance vertically. The lip 70, as shown in FIG. 6 extends for the length of the brace section 51. As stated, the brace sections 51 are spaced apart along the length of upright walls 47 and thus the lips 70 are not continuous along the length of the landscape edging members 50.

As shown in FIG. 7, two of the landscape edging members 50 can be formed into a set or inverted pair 72 of two landscape edging members. A first landscape edging member 50A is positioned as shown in FIG. 5, and a second landscape edging member SOB which is identically made, is inverted so that the inclined or gusset walls 60 of the respective landscape edging members 50A and 50B are facing each other. The lip 70 of the landscape edging member SOB is positioned outside the upper end 47A of the vertical wall 47 of the landscape edging member 50A, and the upper end 47A of the wall 47 of the landscape edging member SOB is positioned to the inside of lip 70 of the landscape edging member 50A. The inverted pair 72 of landscape edging members have the lips 70 that are narrow and of a selected vertical height as disclosed for lip 32, to keep the two landscape edging members of inverted pairs from shifting laterally when stacked and strapped or otherwise bundled, as shown in FIG. 4.

The upper or outer ends 47A of the walls 47 rest on the respective flat surface of wall segment 68 between the junction 62 of the gusset or inclined wall 60 and the base 52, and the respective lip 70 of the mating landscape edging member, as shown. This set 72 of two nested landscape edging members 50A and SOB then can be stacked on top of another nested pair or set essentially as shown with the sets of landscape edgings 40 and 42 shown in FIG. 3, and then held with suitable strapping as desired.

Again, the use of the flat wall segments to the exterior of the junctions between the base walls and the inclined walls, with vertical lips that form stops at the outer edges of the base wall, prevents lateral shifting of the inverted and nested landscape edging members so that the units will not tend to shift laterally. The landscape edging members have extrudable cross sections, that is, no raised, vertical walls or protrusions along their lengths. The lips 32 or 70 stacked landscape edging members prevent lateral shifting so that the top of the upright walls will not slip off the facing base wall of the other landscape edging member in the set. The members in each set will not vibrate back and forth relative to each other to abrade and otherwise possibly damage the landscape edging members in shipping.

It is shown that the lips 70 or 32 do not have to be continuous along the length of the landscape edging members. Short sections of the lips spaced along the length of the landscape edging members will accomplish the function of preventing lateral shifting between the inverted pairs of landscape edging members. Other manufacturing methods can be used instead of extruding and the lips can be formed at intervals along the length of the landscape edging member.

As stated, the brace or inclined walls can be eliminated, so the landscape edging members may be shaped like an L with a base having an attached upright wall along one edge and a retaining lip of effective length along the other edge. T shaped landscape edging members also can be made and stacked as inverted pairs, with edge lips on the base used to keep the sections from lateral shifting. A "T" shaped section is formed or can be visualized if the inclined wall 28 and brace walls 34 and 326 were removed in FIG. 1, and an "L" shaped section is formed by removal of the inclined wall 28, brace walls 34 and 36, and the extension wall 24.

However, the planar base walls with no upstanding molded protrusions or vertical wall make manufacture easy. There is no need to form interlocking posts and sockets for retaining the sections of landscape edging members in inverted pairs. The landscape edging members of this disclosure, in other words are straight along all longitudinal lines extending the length of the members or along the length of the shorter brace sections, with no protrusions or vertical walls along the wall segments 34 and 68.

Although the present invention has been described with reference to preferred embodiments, workers skilled in the art will recognize that changes may be made in form and detail without departing from the spirit and scope of the invention.

What is claimed is:

1. A stackable landscape edging member comprising a base wall, a substantially upright wall secured with respect to the base wall and extending upwardly therefrom and having a free upper edge, said base wall and upright wall having lengths, the base wall extending laterally of the upright wall and generally perpendicular thereto, and having an outer edge portion, an upstanding lip extending upwardly along at least part of the outer edge portion of the base wall, a brace wall joined to the base wall at a junction adjacent to and spaced inwardly from the upright lip, and extending to overlie the base wall and join the upright wall at a position spaced downwardly from the free upper edge of the upright wall, there being a substantially planar base wall segment between the junction of the brace wall and the base wall and the upright lip, the base wall comprising a lateral horizontal base wall extension extending from the upright wall in a direction opposite from the lip, said lateral horizontal base wall extension forming a support for underlying a segmental pavement member to be restrained by said stackable landscape edging member.

2. The landscape edging member of claim 1, wherein the base wall and at least portions of the brace wall are formed as a separate assembly, the upright wall having supports on a back side thereof, each of the upright wall and the base wall having wall segments engaging the supports on the upright wall to form the landscape edging member.

3. The landscape edging member of claim 2, wherein the base wall and the brace wall are integral and form a separate brace section, said brace section being substantially shorter than a length of the upright wall, and a plurality of the brace sections being positioned along the upright wall, the lateral horizontal base wall extension extending outwardly from a lower end of the upright wall in direction opposite from the upright lip, and a series of notches formed in the lateral horizontal base wall extension to permit the upright wall to be flexed along its length between the brace sections.

4. The landscape edging member of claim 1, wherein the base wall, the upright wall, the brace wall and the lip are planar.

5. A stack of landscape edging members of claim 1, comprising a first such landscape edging member in combination with a second such landscape edging member, the second landscape edging member being inverted from the first landscape edging member and nesting thereon with the free upper edge of each landscape edging member resting on the base wall segment of the other landscape edging member, the lips of each landscape edging member overlapping the upper edge of the upright wall of the other landscape edging member and being of effective length to restrain lateral shifting of one of the nesting first and second landscape edging members in the stack relative to each other.

6. The landscape edging member of claim 1, wherein the landscape edging member is a unitary piece and the lip and upright wall are substantially parallel.

* * * * *